US006084165A

United States Patent [19]

Chapman

[11] Patent Number: 6,084,165

[45] Date of Patent: Jul. 4, 2000

[54] RETRACTABLE TAIL ON A STRINGED INSTRUMENT BODY

[76] Inventor: Emmett H. Chapman, 6011 Woodlake Ave., Woodland Hills, Calif. 91367-3238

[21] Appl. No.: 08/910,286

[22] Filed: Aug. 13, 1997

Related U.S. Application Data

[60] Provisional application No. 60/023,858, Aug. 13, 1996.

[51] Int. Cl.$^7$ ........................................ G01D 3/00

[52] U.S. Cl. ........................ 84/291; 84/267; 84/300; 84/280

[58] Field of Search ........................ 84/291, 267, 290, 84/300, 301, 302, 280

[56] References Cited

U.S. PATENT DOCUMENTS 4,646,613 3/1987 Banchetti .............................. 84/327

5,747,711 5/1998 Cavaness et al. .................... 84/291

*Primary Examiner*—Robert E. Nappi
*Assistant Examiner*—Kim Lockett
*Attorney, Agent, or Firm*—J. E. McTaggart

[57] ABSTRACT

A solid instrument body of a stringed musical instrument is provided with a tail, disposed at the body end of the instrument, which can be extended or retracted. The tail is held in place by adjustable fastening means that allow it to extend up to about ten inches beyond the body portion for purposes of balanced feel and design, or to retract to a concealed location, to reduce the instrument to a compact size such that its total length is only slightly greater than the string length. For playing in a standing position a support strap is attached to the end of the tail. The tail may be shaped to have a slight taper and squared-off end so as to balance and complement a similar but more elongated design of the "headless" neck portion. The instrument can be made to be played using a two-handed string tapping technique while supported in a predominantly upright position as with the Chapman Stick (registered) family of stringed instruments, or can be played in the predominantly horizontal position using conventional technique. For a seated player position, the tail serves as a height-adjustable stand or pedestal that carries the weight of the instrument in the manner of the spike on a string bass or cello.

18 Claims, 2 Drawing Sheets

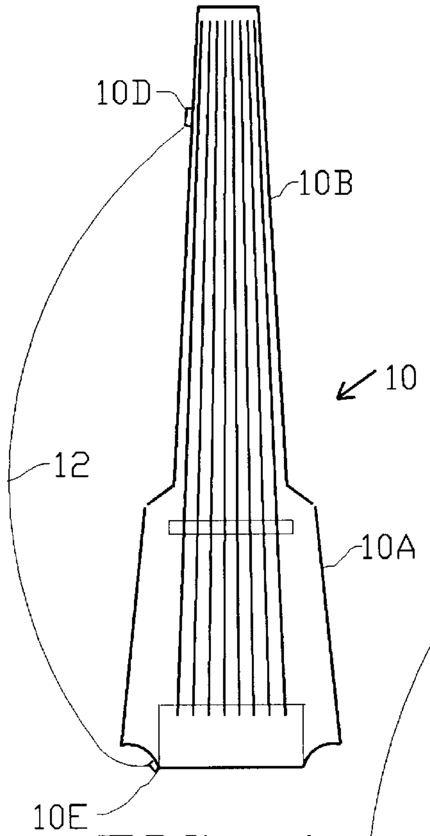
FIG. 1
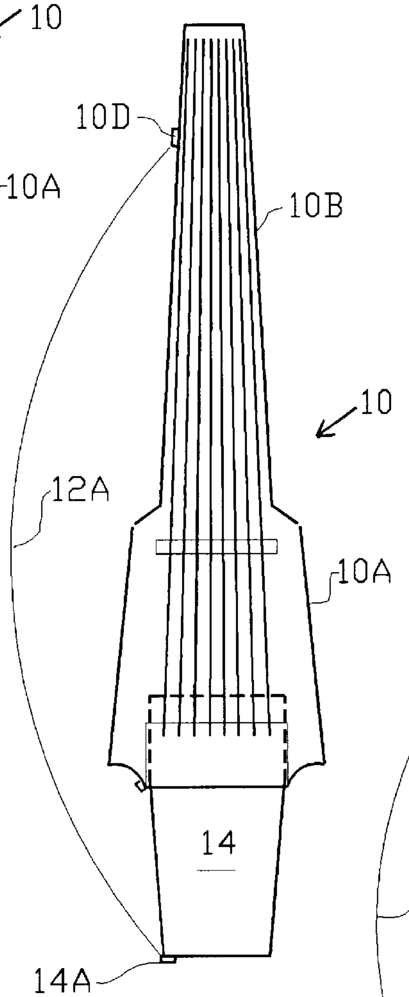
FIG. 2
FIG. 3
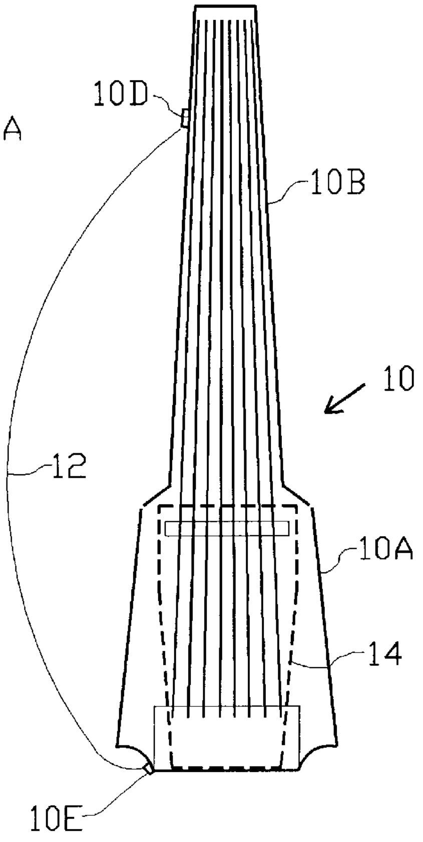

RETRACTABLE TAIL ON A STRINGED INSTRUMENT BODY

PRIORITY

Benefit is claimed under 35 U.S.C, § 119(e) of pending Provisional application No. 60/023,858 filed Aug. 13, 1996.

FIELD OF THE INVENTION

The present invention is in the field of stringed musical instruments such as electric guitars and bass guitars and, although particularly directed to the instruments in the Chapman Stick (registered) family which are played by a two-independent-handed string tapping technique, is not restricted thereto since it can be applied generally to all stringed instruments of the guitar family.

BACKGROUND OF THE INVENTION

The body design of stringed instruments of the guitar family has evolved from the classical acoustic forms in which an enclosure formed a sound chamber, typically forming two acoustically coupled chambers of different size and resonant frequency providing the important and critical function of acoustically amplifying sound from the strings.

DISCUSSION OF RELATED KNOWN ART

Electronically amplified stringed instruments no longer require an acoustic chamber, but are often made with a solid enlarged body portion aesthetically suggestive of an acoustic sound box but not functioning as such; instead it can serve to support items such as the bridge, electric pickups, controls, and a shoulder strap. The instrument body, as merely a symbolic reminder of the acoustic era, may be made smaller or virtually eliminated in favor of a primarily functional configuration which ay be in essence an elongated fingerboard to which is attached a pickup housing and/or volume/tone control mounting facility, as in instruments of the Chapman Stick (registered) family originated by the present inventor, which are played by a two-independent-handed string tapping technique as disclosed, for example, in U.S. Pat. Nos. 3,868,880 and 3,833,751 to Chapman, the present inventor.

Making the body small and reducing the length of the instrument to its functional minimum, as constrained primarily by string length, provides certain advantages such as minimum size, convenient handling, small carrying case size, etc. However with the importance of visual impact in the performing arts, there is conflicting need to fashion the body in a manner to provide a fuller and more balanced elongated appearance. Furthermore, in consideration of the important factors of player comfort and satisfaction, it is of benefit to the perception of balance, both in appearance and in playing "feel", to configure the body portion with a tail extending well beyond the string ends.

OBJECTS OF THE INVENTION

It is a primary object of the present invention to provide a stringed musical instrument configuration that provides a tail extending from the body to a point substantially beyond the end of the strings, while still providing means for transfiguring the instrument into a more compact form in which the tail virtually disappears and the reduced length approaches the limit of minimum length, i.e. the string length.

It is a further object that the musical instrument be made to be playable in either the extended form or the retracted form.

It is a still further object to make the retractable tail continuously adjustable with regard to the dimension of extension beyond the minimum length so as to provide a built-in adjustable "spike" with which to alter the instrument elevation relative to the player in a sitting position with the instrument in a nearly vertical position for the "tapping" technique.

It is a still further object to provide a body extension on a stringed instrument that will increase the span of support strap and thus provide better balanced support, enabling the instrument to be played comfortably in a variety of modes including (a) a predominantly vertical orientation, as used with two handed tapping technique, (b) a predominantly horizontal orientation as used with conventional picking, plucking and strumming techniques, (c) a diagonal orientation which allows flexibility between modes (a) and (b), greatly expanding the expressive possibilities immediately available to the player. Additionally, it can be played in a range of other intermediate orientations.

It is a still further object to provide a stringed musical instrument that can be altered in shape and style to satisfy differing individual user preferences in playing method, expressive techniques, posture, and the feel and sound of the instrument.

SUMMARY OF THE INVENTION

The abovementioned objects have been accomplished by the present invention by making the body of the instrument large enough to include a rear cavity for enclosing a variable portion of an extendable tail. The cavity is made large enough to completely enclose the tail in the retracted mode, while the tail is configured such that in a fully extended mode, a substantial portion of the tail remains in the cavity for support purposes.

BRIEF DESCRIPTION OF THE DRAWINGS

The above and further objects, features and advantages of the present invention will be more fully understood from the following description taken with the accompanying drawings in which:

FIG. 1 is a plan view of a stringed musical instrument of the resent invention showing the external appearance with the tail retracted.

FIG. 2 shows the subject matter of FIG. 1 with the tail extended, showing a hidden outline of the tail.

FIG. 3 shows the subject matter of FIG. 1, showing a hidden outline of the tail in its retracted position.

DETAILED DESCRIPTION

FIG. 1 shows a stringed instrument 10 of the type that is intended to be electronically amplified and thus has a body portion 10A that is substantially smaller than an acoustic body. Body 10A can be made solid; and is firmly attached to a "bolt-on" neck portion 10B in the preferred embodiment; alternatively body 10A and neck portion 10B could be formed integrally. Neck portion 10B is shaped to taper slightly toward a squared-off end, as shown at the top, which is of the "headless" category since the tuning heads 10C for adjusting string tension are located at the lower end of the strings past the tailpiece as opposed their conventional location at the upper end of the neck portion on the headstock.

A playing strap 12 is attached by a strap attachment button 10D, or other conventional attachment means, near the upper end of the neck portion 10B, typically in the region of the third fret, and at button 10E located at or near the lower end of the body portion 10A. The total length of instrument 10 is seen to be only marginally longer than the strings.

FIG. 2 shows the instrument of FIG. 1, now seen to have a tail 14 extending from the body 10A. A portion of tail 14 remains concealed within or behind the body portion 10A as indicated by the hidden outline shown in broken lines; tail 14 is attached in the position and held in place by adjustable fastening means so as to extend beyond the body portion 10A as shown.

Strap 12A, which may be made longer than strap 12 in FIG. 1, is attached at the top by button 10D as in FIG. 1, but at the bottom by button 14A on tail 14, which is made to have a slight taper and squared-off end so as to balance and complement the appearance of the neck portion 10B as well as improving the physical balance, particularly with regard to support received from strap 12A that enhances the playing feel and comfort.

FIG. 3 shows the instrument 10 of FIG. 2 with the tail 14 in a retracted position, indicated by the hidden outline, where it is concealed entirely within or behind the body portion 10A, held by the adjustable fastening means. As in FIG. 1, strap 12A can be attached by buttons 10D and 10E.

FIGS. 4–7 show four main playing modes for the instrument with the tail 14 deployed in place as in FIG. 2.

Figure 4:
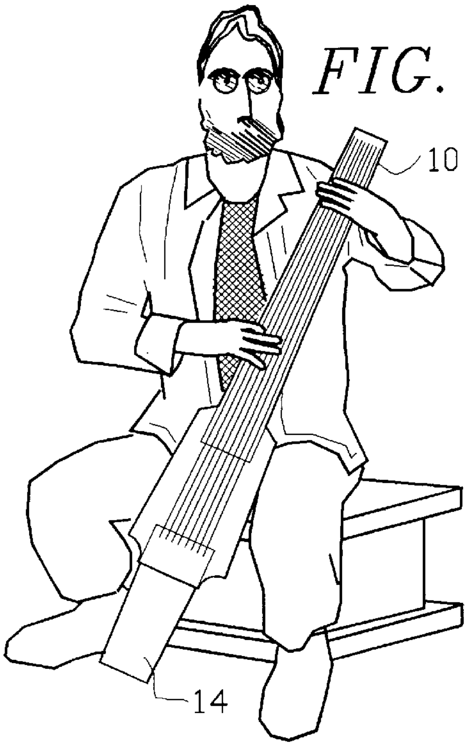
FIGS. 4–7 show four different playing positions of the instrument of the present invention.

FIG. 4 shows the instrument 10 held in a generally upright position, with the player seated and his hands positioned for the two-handed tapping technique of the above mentioned Chapman Stick. For playing in the seated position of FIG. 4, the tail 14 can rest on the floor or ground, serving as a height-adjustable stand or pedestal that carries the weight of the instrument 10 in the manner of the floor spike of a bass violin or cello. For this purpose, the lower end of tail 14 may be fitted with a rubber tip.

Figure 5:
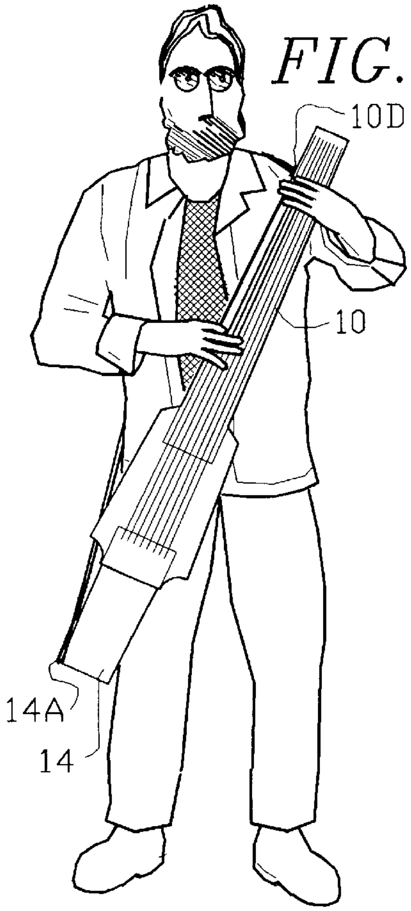

FIG. 5 shows essentially the same playing position of instrument 10 for technique used in FIG. 4, but with the player in a standing position. In this mode, strap 12, being lengthened in accordance with the extended length of tail 14 and attached at buttons 10D and 14A, acts to support the instrument in a comfortable balanced manner that keeps the player's hands free; this is particularly important for playing with the two-handed tapping technique of playing, created by the inventor, whereby both hands are equally oriented substantially at right angles to neck and strings, and addressing the fretboard from opposite sides, so as to enable a full, four-fingered, scalar and melodic technique equally in each hand simultaneously.

Figure 6:
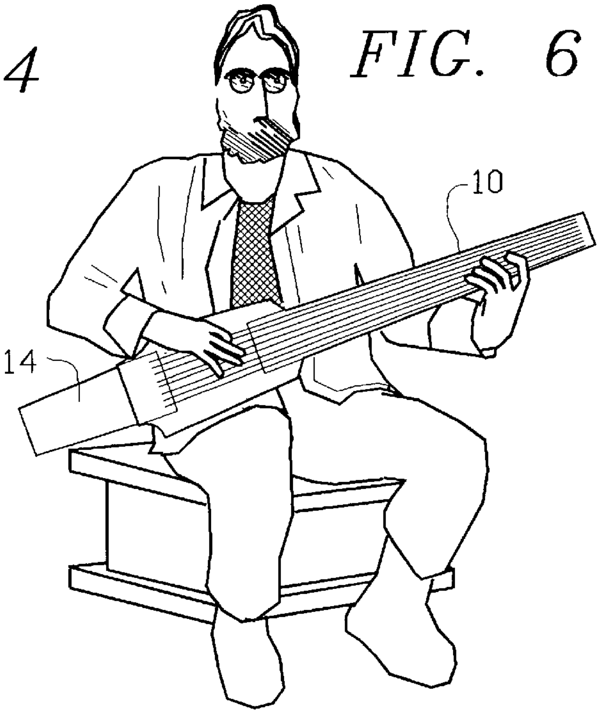

FIG. 6 shows the instrument 10 held in a generally horizontal position for playing in the conventional manner of electric guitars and bass guitars, showing the player seated with the instrument 10 resting on a leg.

Figure 7:
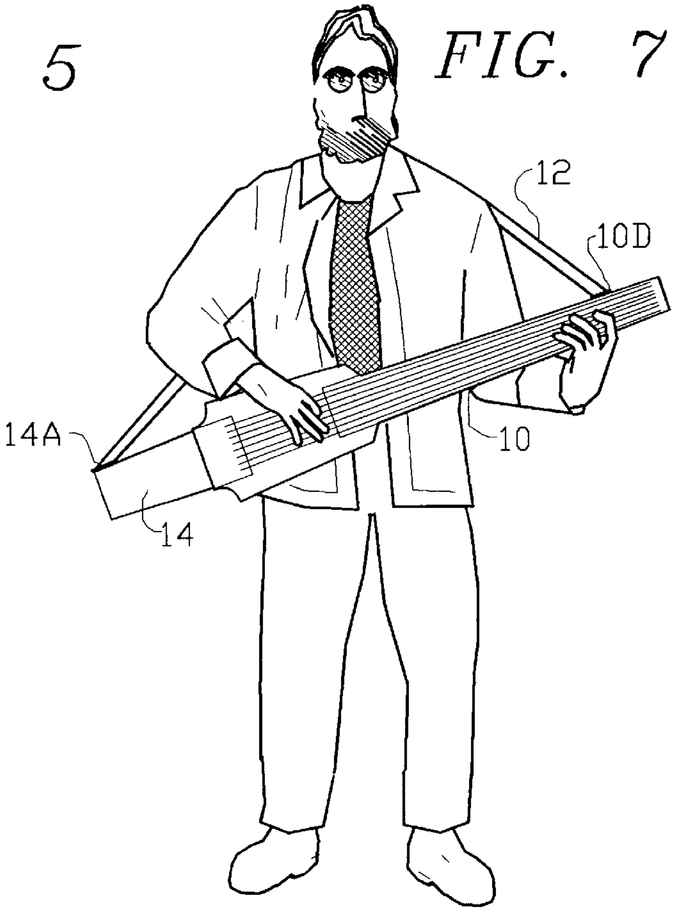

FIG. 7 shows essentially the horizontal instrument position and conventional playing technique used in FIG. 6, but with the player in a standing position and the instrument 10 supported by strap 12, as in FIG. 2.

In FIGS. 5 and 7 the strap 12 is attached to a specially selected location of button 10D on the upper side of the headless neck 10B, a few frets from its end, and button 14B at or near the end of tail 14. By selecting the position of buttons 10D and 14A, the instrument can be made to hang with the fret board tilted slightly upward into the player's field of view both in the vertical playing position and in the horizontal playing position.

For any of the above described playing positions the tail 14 could be partially or fully retracted and the strap 12 shortened. The button (or other attachment means) 14B for the tail 14 can be made to provide several fixed working locations, or to provide a continuous range of extension adjustment of the tail 14. In a preferred embodiment, the tail 14 is made to be extendable to a maximum of about ten inches.

The tail 14 can be located entirely behind the body portion 10A and can be attached by adjustable screw and/or bracket means that can be provided or designed from conventional resources for this purposes. Alternatively it may be partially or fully enclosed in a cavity configured in the body portion 10A: the cavity can be made close-fitting to provide a degree of frictional retention. Metal spring friction and/or detent means can also be provided in an open, semi-enclosed or fully enclosed implementation.

The instrument can be made with a desired number of strings, typically eight or ten.

As an alternative to the solid form shown for tail 14, which could made from metal or plastic, it could be made in the form of an open metal perimeter frame or grille configuration; this could include a central member by which the tail 14 could be adjustably attached to body 10A by means of a bracket.

The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description.

What is claimed is:

1. A dual-configuration stringed musical instrument, comprising:

a body portion;

a neck portion extending in a first direction from the main body portion to an outward end of the neck portion;

a tail, constructed and arranged to be adjustably extendable and fully retractable relative to said body portion in a manner to provide a user with capability of deploying a modal configuration of the stringed musical instrument selected from the following two modal configurations in which the instrument can be played:

(1) a first modal configuration wherein said tail is substantially concealed from surrounding viewers, and (2) a second modal configuration wherein said tail extends in a direction opposite the first direction of said neck portion, to an outward end of said tail displaced from said body portion by an exposed-tail dimension that can be set by the user to any desired value up to a predetermined maximum;

a first strap attachment fitting deployed in a predetermined location alone said neck portion and a second strap attachment fitting deployed in an end region of said tail, said first and second strap attachment fittings being configured and arranged to engage respective opposite ends of a playing strap so as to support the instrument (a) when deployed in the first modal configuration with a minimal fixed span between the two fittings, as well as (b) when deployed in the second modal configuration wherein adjustment of the exposed-tail dimension provides a variable span between said two attachment fittings.

2. The dual-configuration stringed musical instrument as defined in claim 1, wherein:

said body portion and said tail are configured in a manner to cause said tail to become substantially concealed behind a regularly visible region of said body portion when the first modal configuration is deployed.

3. The dual-configuration stringed musical instrument as defined in claim 1, wherein:

said body portion is configured with a cavity region located, shaped and arranged to at least partially contain and substantially conceal said tail when the first modal configuration is deployed.

4. The dual-configuration stringed musical instrument as defined in claim 1, wherein:

said body portion is configured with a cavity region configured to fully contain and substantially conceal said tail when the first modal configuration is deployed.

5. The retractable tail system as defined in claim 1 further comprising a cap of resilient material deployed over the outward end of said tail, whereby, in the second modal configuration, the instrument may be supported on a floor surface and played from a seated position, the height of the instrument being user adjustable through adjustment of the exposed-tail dimension.

6. The dual-configuration stringed musical instrument as defined in claim 1, wherein:

said neck portion is made to have an elongated generally-rectangular shape, tapered in a manner to decrease in width toward the outward end of said neck portion, and said tail is made to have a generally rectangular shape, tapered in a manner to decrease in width toward the outward end of said tail;

whereby said neck portion and said tail are made to present an aesthetically integrated and balanced appearance when the second modal configuration is deployed.

7. The dual-configuration stringed musical instrument as defined in claim 6, further comprising:

a set of playing strings of said stringed musical instrument extending from a first string end location in a region of said body portion to a second string end location in an end region of said neck portion;

said stringed musical instrument being of a type having no string tuning mechanism deployed in the end region of said neck portion and thus being classified as headless.

8. The dual-configuration stringed musical instrument as defined in claim 1 wherein said tail playing strap attachment means is configured and arranged in a manner to additionally enable the playing strap to be utilized when said tail is deployed in the first modal configuration.

9. The dual-configuration stringed musical instrument as defined in claim 1, further comprising:

a third strap attachment fitting, deployed in a predetermined location in an end region of said body portion opposite the neck portion, configured and arranged to co-operate with said first strap attachment fitting in engaging opposite ends of a playing strap so as to support the instrument for performing with said tail deployed in the first modal configuration.

10. A retractable tail system, in a stringed musical instrument having a main body portion and having a neck portion extending therefrom in a first direction, comprising:

a tail configured and arranged to engage and co-operate with the main body portion in a laterally-constrained telescopic manner that enables said tail to be extendable from the main body in a direction opposite that of the neck portion, to be fully retractable relative to the main body portion, and thus to be deployable in a modal configuration selected from the following two modal configurations:

(1) a first modal configuration wherein said tail is retracted and thus caused to be concealed from surrounding viewers, and (2) a second modal configuration wherein said tail extends by a user-set exposed-tail dimension from the main body portion of the instrument to an outward end of said tail.

11. The retractable tail system as defined in claim 10, wherein said tail is made to have a generally rectangular shape, tapered in a manner to decrease in width toward the outward end thereof.

12. The retractable tail system as defined in claim 10 wherein said tail and the main body portion are constructed and arranged to co-operate in a manner to provide user adjustment of the exposed-tail dimension to any desired dimension up to a predetermined maximum dimension, whereby the instrument may be played with the exposed-tail dimension thusly adjusted when the second modal configuration is deployed.

13. The retractable tail system as defined in claim 12 further comprising a cap of resilient material deployed over the outward end of said tail, whereby, in the second modal configuration, the instrument may be supported on a floor surface and played from a seated position, the height of the instrument being user adjustable through adjustment of the exposed-tail dimension.

14. A dual-configuration stringed musical instrument, comprising:

a main body portion having a neck-attachment end and a tail-attachment end opposite the neck-attachment end;

a neck portion, attached in a fixed manner to and extending from the neck-attachment end of said main body portion, having a generally flat forward-facing fingerboard surface and having a predetermined neck width at the neck attachment end of the main body portion; and a tail, having a substantially rectangular cross-sectional shape defining a generally flat forward-facing surface with a minimum width at least 20% of the neck width, attached to said main body portion at the tail-attachment end thereof in an adjustable slidable manner such that a user of said instrument can adjust said tail so as to render said musical instrument playable in a modal configuration selected from the following two modal configurations;

(1) a first modal configuration wherein said tail is retracted so as to remain substantially concealed from surrounding viewers, and (2) a second modal configuration wherein said tail extends from the tail-attachment end of said main body by an exposed-tail dimension that is settable by the user.

15. The dual-configuration stringed musical instrument as defined in claim 14 wherein:

said neck and said tail are each made to have a corresponding generally rectangular elongated tapered shape in forward-facing profile, decreasing in width with increasing distance from said main body portion, such that said tail is made to have sufficient width to provide a selection of ergonomically beneficial points of location for attachment of a playing strap and to provide an aesthetically integrated and balanced appearance of said instrument when the second modal configuration is deployed.

16. The dual-configuration stringed musical instrument as defined in claim 14 wherein:

said body portion is configured with a cavity region located, shaped and arranged to substantially conceal said tail when the first umodal configuration is deployed.

17. The dual-configuration stringed musical instrument as defined in claim 14, further comprising:

a plurality of playing strap attachment fittings deployed in corresponding selected locations of said musical instrument, including at least one fitting each on said neck, on said body, and on said tail, the locations being selected such as to enable a user to attach a playing strap to said stringed musical instrument optimally for playing said instrument with said tail deployed in the first modal configuration, as well as optimally for playing said instrument with said tail deployed in the second modal configuration with a variety of exposed-tail dimensions.

18. The dual-configuration stringed musical instrument as defined in claim 14 further comprising a cap of resilient material deployed over an outward end of said tail, such that, in the second modal configuration, said instrument may be supported on a floor surface and played from a seated position, the height of the instrument being user-settable through adjustment of the exposed-tail dimension.

* * * * *